D. GUPTAIL,

Assignor, by mesne assignments, to C. La Dow.

Cultivator.

No. 9,087. Reissued Feb. 17, 1880.

*Charles La Dow Assignee of*

*INVENTOR*

*Dan Guptail,*

*By his Attorneys*

Baldwin, Hopkins & Peyton

*WITNESSES*

Wm A. Skinkle

Geo W. Breck

UNITED STATES PATENT OFFICE.

DAN GUPTAIL, OF ELGIN, ILLINOIS, ASSIGNOR, BY MESNE ASSIGNMENTS, TO CHARLES LA DOW.

CULTIVATOR.

SPECIFICATION forming part of Reissued Letters Patent No. 9,087, dated February 17, 1880.

Original No. 69,801, dated October 15, 1867. Application for Reissue filed December 13, 1879.

*To all whom it may concern:*

Be it known that I, DAN GUPTAIL, of Elgin, in the county of Kane and State of Illinois, have invented certain new and useful Improvements in Cultivators, of which the following is a specification.

The objects of my invention are to vary the depth of cut of the shovels; to deflect rubbish from the machine and prevent the shovels from clogging; to vary the angle of the frame-bars relatively to each other and make the shovels cut at an angle to the line of draft; to prevent the jumping and vibration of the machine; to brace the shovels against excessive rearward strain, and to prevent the shovels from being drawn through the apertures in the frame-bars in which they are secured.

Figure 1:
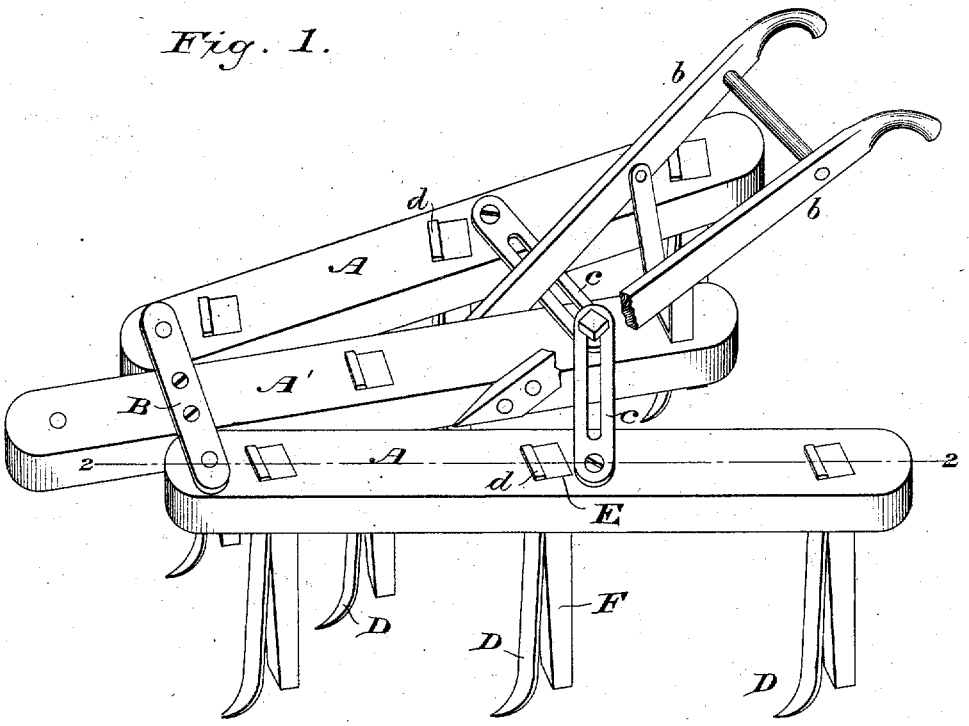
Figure 2:
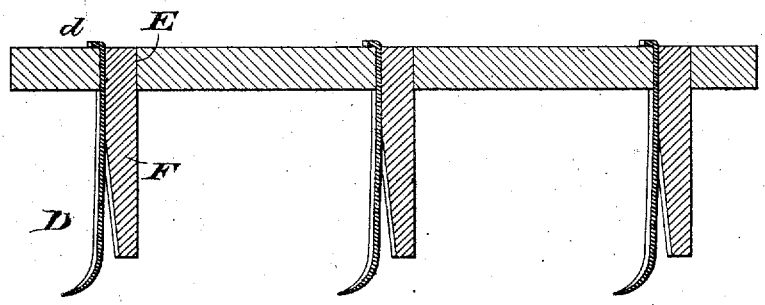

In the accompanying drawings, Figure 1 is a perspective view of my improved machine with one of the handles partly broken away, and Fig. 2 is a section on the line 2 2 of Fig. 1.

The frame of the cultivator is composed of bars A A A′, and may be constructed as shown in the drawings, or in any other suitable manner. The bars are united at their forward ends by a link, B, which is securely bolted to the central bar, A′, to which link the bars A A are pivoted, so as to permit of a horizontal movement. Handles *b b* are secured upon the bar A′, as shown.

Slotted link-rods C C are pivoted upon the bars A A, and a set-screw on the bar A′ works in them. By this means the frame-bars may be brought close together, or may be separated so as to increase the angle of the bars A A relatively to the line of draft and to each other. The shovels D, of which there may be any suitable number, are secured axially upon the bars of the frame and are made of spring-steel, their lower ends being curved or bent forward to form the shear or cutting part of the shovel.

The spring-shovels on the bars A A are secured in position by locking devices or keys F in mortises or rectangular apertures E, cut diagonally therein, as shown. These wedges or keys are beveled or cut away on the sides next the shovels, as shown, so as to allow the shovels to yield rearwardly. The upper ends of the shovels are bent over so as to form clasps or hooks *d*, which prevent them from being drawn through the apertures in the frame. The angle at which the spring-shovels are set relatively to their bars A A is sufficient to make them cut squarely across the line of draft when their bars are set at their greatest obliquity to said line. The shovels secured upon the central bar, A′, of the frame are also set across the line of draft.

It will be obvious that by increasing the obliquity of the bars A A the shovels thereon will be caused to cut at an angle to the line of draft, and that the less the obliquity of the bars the greater will be the angle of the shovels. By this arrangement the furrows will be turned outward from the machine, while the space between the adjustable bars will be cut out by the shovel on the central bar of the frame, and as the draft comes somewhat edgewise upon the shovels, they are more capable of resisting strains, their vibrations are decreased, and their faces are prevented from clogging with wet or sticky earth.

By means of the fastening devices or wedges for locking the shovels in the frame I am enabled to adjust them vertically relatively thereto, and thus regulate their depth of cut and extent of vibration, as it is obvious that the greater the distance between the frame and the ends of the shovels the greater will be their vibration.

By supporting the frame by the spring-shovels, arranged one in advance of another, as shown, not only the vibration or jumping of the frame is compensated and the frame made to run steadily, but a greater vibration of the spring-shovels is caused than where a single rank of spring-shovels arranged at right angles to the line of draft is used, as it is obvious that when the frame will not yield to the resistance offered to any particular shovel the vibration of that shovel must be greater than if the frame yield to its strain.

The earth is more readily and thoroughly loosened and pulverized by the vibrating spring-shovels than by the ordinary teeth, which had before the date of my invention been used in this class of machines.

By using spring-shovels on a V-shaped frame rubbish encountered by the machine in its passage over the field is deflected, the vibrations of the shovels throwing it forward and aside. This is especially so where the shovels enter the earth at an angle to the line of draft.

It will be observed that with the arrangement of shovels herein shown each one cuts a different furrow, and that no two run in the same line; and that they are so interspersed on the frame as to prevent its undue vibration or jumping.

I am aware that V-shaped frames having ranks of rigid teeth are old, and that such teeth have been vertically adjustable on the frame; but the teeth being rigid were liable to become clogged, would not deflect rubbish from the machine, and were incapable of yielding to obstructions.

I am also aware that the bars of V-shaped frames supported by rigid teeth have been made adjustable relatively to each other, and I do not, therefore, claim such subject-matter.

I claim as of my own invention—

1. The combination, substantially as hereinbefore set forth, of the frame and spring-shovels which support it and are adjustable relatively thereto, whereby the depth of cut and extent of vibration of the shovels may be regulated.

2. A V-shaped frame having spring-shovels mounted thereon.

3. The combination, substantially as hereinbefore set forth, of the pivoted frame-bars, spring-shovels mounted thereon, and mechanism, substantially such as described, for adjusting the bars relatively to each other.

4. The combination, substantially as hereinbefore set forth, of the frame and ranks of spring-shovels supporting the frame, the shovels in each rank being arranged one in advance of the other.

5. The combination, substantially as hereinbefore set forth, of the frame, the spring-shovels mounted thereon and arranged one in advance of the other, and supports for resisting rearward strains upon the shovels.

6. The combination, substantially as hereinbefore set forth, of the frame, the spring-shovels having hooks upon their upper ends, and wedges or locking devices for securing the shovels in place.

DAN GUPTAIL.

Witnesses:
O. P. CHISHOLM,
E. H. RIEKER.